(12) United States Patent
Toriyama et al.

(10) Patent No.: US 12,176,780 B2
(45) Date of Patent: Dec. 24, 2024

(54) BRUSHLESS MOTOR

(71) Applicant: MITSUBA Corporation, Gunma (JP)

(72) Inventors: Keisuke Toriyama, Gunma (JP); Ryo Ohori, Gunma (JP)

(73) Assignee: MITSUBA Corporation, Gunma (JP)

( * ) Notice: Subject to any disclaimer, the term of this patent is extended or adjusted under 35 U.S.C. 154(b) by 258 days.

(21) Appl. No.: 17/784,111

(22) PCT Filed: Jul. 27, 2021

(86) PCT No.: PCT/JP2021/027672
§ 371 (c)(1),
(2) Date: Jun. 10, 2022

(87) PCT Pub. No.: WO2022/038975
PCT Pub. Date: Feb. 24, 2022

(65) Prior Publication Data
US 2023/0016162 A1    Jan. 19, 2023

(30) Foreign Application Priority Data

Aug. 21, 2020 (JP) .................... 2020-139816

(51) Int. Cl.
*H02K 3/52* (2006.01)
(52) U.S. Cl.
CPC ......... *H02K 3/522* (2013.01); *H02K 2203/09* (2013.01); *H02K 2203/12* (2013.01)
(58) Field of Classification Search
CPC .......................... H02K 3/522; H02K 2203/12
(Continued)

(56) References Cited

U.S. PATENT DOCUMENTS

2016/0028285 A1* 1/2016 Ogawa .................... H02K 3/52
310/216.001
2016/0043604 A1* 2/2016 Yoshida ................ H02K 3/325
310/71
(Continued)

FOREIGN PATENT DOCUMENTS

CN            201286037         8/2009
DE         112012006771         7/2015
(Continued)

OTHER PUBLICATIONS

"International Search Report (Form PCT/ISA/210) of PCT/JP2021/027672," mailed on Sep. 14, 2021, with English translation thereof, pp. 1-4.
(Continued)

*Primary Examiner* — Terrance L Kenerly
*Assistant Examiner* — Theodore L Perkins
(74) *Attorney, Agent, or Firm* — JCIPRNET

(57) ABSTRACT

In a brushless motor including a stator core and a rotor which rotates with respect to the stator core, a coil support wall supports a coil wound around a core main body part from a radially inner side of the core main body part. A first wall part and a second wall part constituting the coil support wall are connected to each other at an angle at a portion of a tooth tip part protruding from a tooth main body part along a circumferential direction of the core main body part, and a thickness dimension of the second wall part is equal to or larger than a thickness dimension of the first wall part along a radial direction of the core main body part.

5 Claims, 8 Drawing Sheets

(58) Field of Classification Search
USPC .................................................. 310/216.105
See application file for complete search history.

(56) References Cited

U.S. PATENT DOCUMENTS

| 2017/0201135 A1* | 7/2017 | Kai | H02K 3/18 |
| 2017/0222513 A1* | 8/2017 | Lee | H02K 3/345 |

FOREIGN PATENT DOCUMENTS

| JP | 2007020325 | 1/2007 |
| JP | 2016001947 | 1/2016 |
| JP | 2018133866 | 8/2018 |
| JP | 2018196171 | 12/2018 |
| WO | 2018150964 | 8/2018 |
| WO | 2019065142 | 4/2019 |

OTHER PUBLICATIONS

"Notice of Reasons for Refusal of Japan Counterpart Application", issued on Dec. 5, 2023, with English translation thereof, p. 1-p. 9.
"Search Report of Europe Counterpart Application", issued on Dec. 8, 2023, p. 1-p. 9.
"International Preliminary Report on Patentability of PCT/JP2021/027672; this report contains the following items: Form PCT/IB/326, PCT/IB/338, PCT/IB/373, PCT/ISA237(cover sheet), PCT/ISA237(Box No. I), PCT/ISA237(Box No. V)", mailed on Mar. 2, 2023, Feb. 16, 2023, Sep. 14, 2021, which is English translation of "Written Opinion of the International Searching Authority", p. 1-p. 12.

* cited by examiner

[Comparative example (without flat part)]

BRUSHLESS MOTOR

CROSS-REFERENCE TO RELATED APPLICATION

This application is a 371 application of the International PCT application serial no. PCT/JP2021/027672, filed on Jul. 27, 2021, which claims the priority benefits of Japan Patent Application No. 2020-139816, filed on Aug. 21, 2020. The entirety of the above-mentioned patent applications is hereby incorporated by reference herein and made a part of this specification.

TECHNICAL FIELD

The present invention relates to a brushless motor including a stator core and a rotor which rotates with respect to the stator core.

RELATED ART

Being excellent in controllability and quietness, a brushless motor includes a stator core (stator) having coils and a rotor which rotates with respect to the stator core. The stator core is provided with a plurality of teeth to protrude radially to the radially inner side thereof. Coils are wound around each of the plurality of teeth by concentrated winding or the like. Then, by sequentially supplying a drive current to a plurality of coils, the rotor is rotated in a predetermined rotation direction at a predetermined rotational speed.

For example, Patent Document 1 describes a brushless motor having a stator core and a rotor. The brushless motor described in Patent Document 1 includes an annular core (stator core), and an insulator (insulating material) is attached to an axial end part of the core. The insulator covers a back yoke part and a tooth part from the axial direction of the core, and the insulator is provided with a flange part (coil support wall) which prevents the coil from collapsing toward the radially inner side.

RELATED ART DOCUMENT

Patent Document

[Patent Document 1] Japanese Patent Application Laid-Open No. 2016-001947

SUMMARY OF INVENTION

Problem to be Solved by Invention

However, in the brushless motor described in Patent Document 1 above, to increase the strength of the insulator, a resin material or metal material (reinforcing member) having a higher rigidity than the insulator is embedded inside the insulator. Therefore, in addition to complicating the structure of the insulator, there is a problem that the manufacturing process of the insulator becomes complicated.

An objective of the present invention is to provide a brushless motor capable of increasing the rigidity of a coil support wall while eliminating the need for a reinforcing member.

Means for Solving Problems

A brushless motor according to the present invention includes a stator core and a rotor which rotates with respect to the stator core. The brushless motor has a core main body part, a plurality of teeth, a tooth main body part, a tooth tip part, and a coil support wall. The core main body part is provided in the stator core and is formed in a cylindrical shape. The plurality of teeth are provided on the core main body part and protrude radially to a radially inner side of the core main body part. The tooth main body part is provided in the tooth and has a base end side connected to the core main body part. The tooth tip part is provided at a tip side of the tooth main body part and is wider than the tooth main body part in a circumferential direction of the core main body part. The coil support wall made of resin is overlapped with the tooth tip part from an axial direction of the core main body part and supports a coil wound around the core main body part from the radially inner side of the core main body part. The coil support wall includes a first wall part and a second wall part arranged in the circumferential direction of the core main body part. The first wall part and the second wall part are connected to each other at an angle at a portion of the tooth tip part protruding from the tooth main body part in the circumferential direction of the core main body part, and a thickness dimension of the second wall part in a radial direction of the core main body part is equal to or larger than a thickness dimension of the first wall part.

Effects of Invention

According to the present invention, the first wall part and the second wall part constituting the coil support wall are connected to each other at an angle at a portion of the tooth tip part protruding from the tooth main body part in the circumferential direction of the core main body part, and the thickness dimension of the second wall part in the radial direction of the core main body part is equal to or larger than the thickness dimension of the first wall part.

Accordingly, the rigidity of the coil support wall can be increased without embedding a reinforcing member in the coil support wall. Therefore, it is possible to effectively suppress collapse of the coil to the radially inner side without complicating the structure or complicating the manufacturing process.

DESCRIPTION OF EMBODIMENTS

Hereinafter, an embodiment of the present invention will be described in detail with reference to the drawings.

Figure 1:
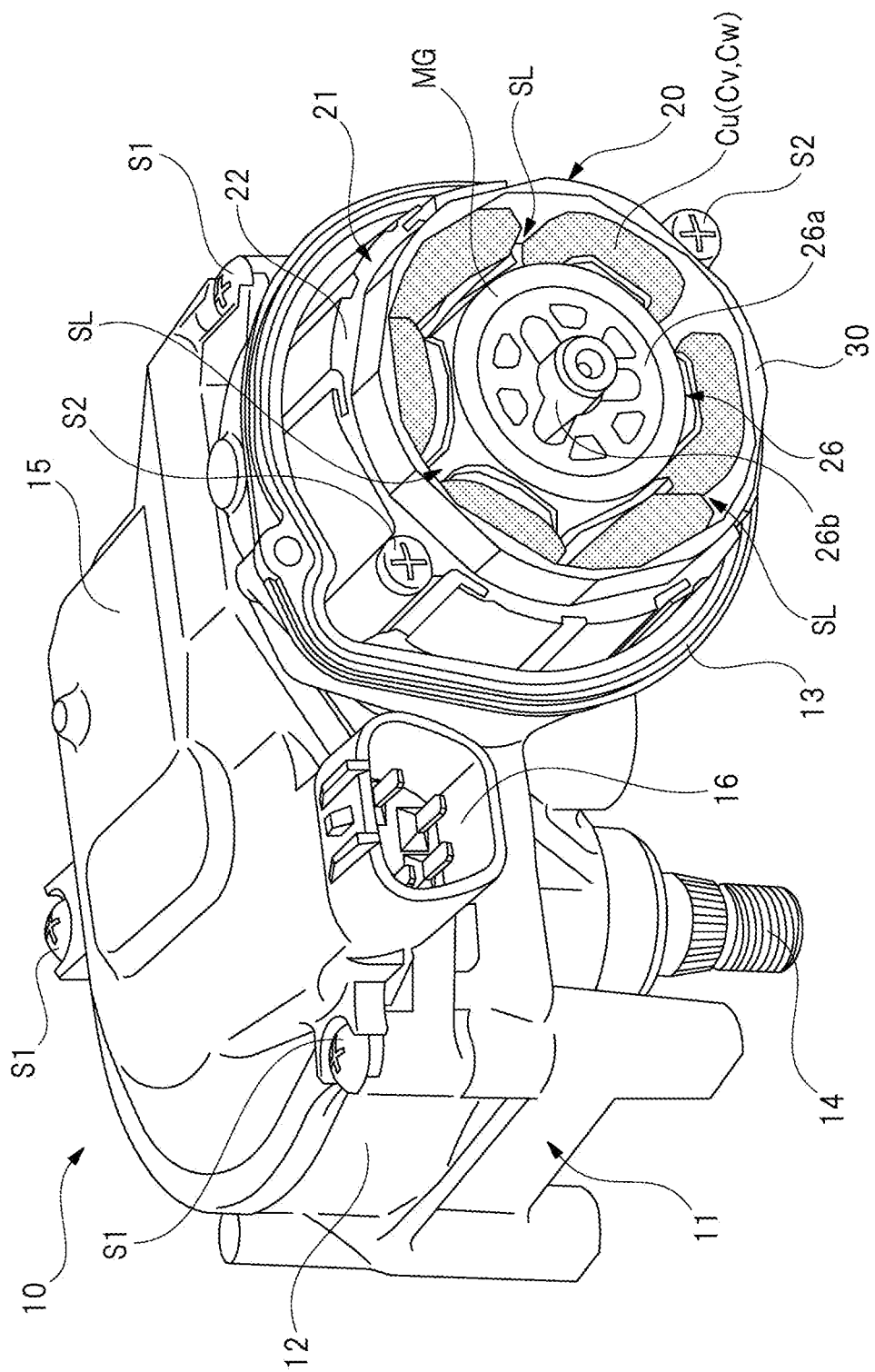
FIG. 1 is a perspective view showing a motor with a speed reduction mechanism (motor cover omitted).
Figure 2:
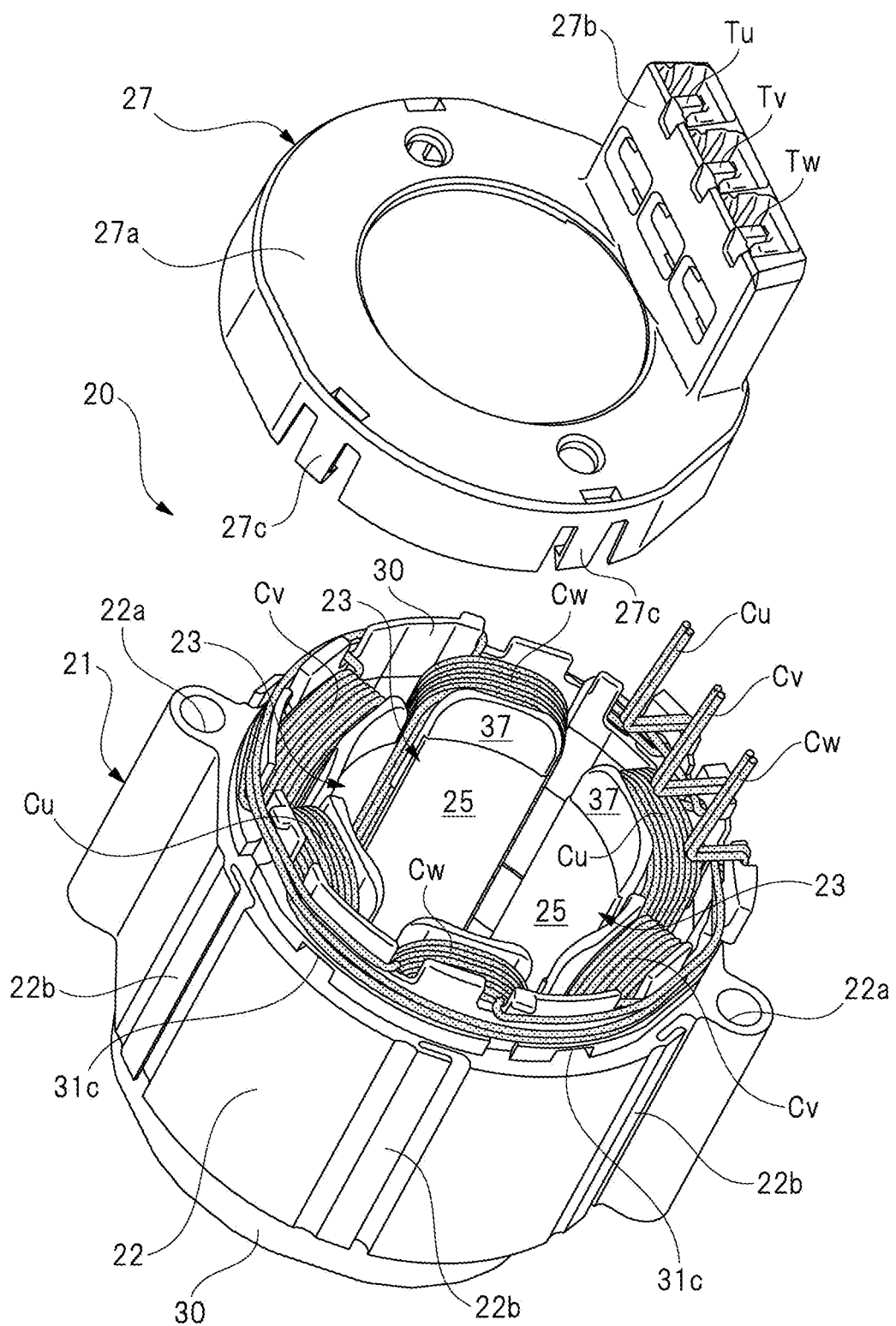
FIG. 2 is a perspective view showing a stator core and a bus bar unit.
Figure 3:
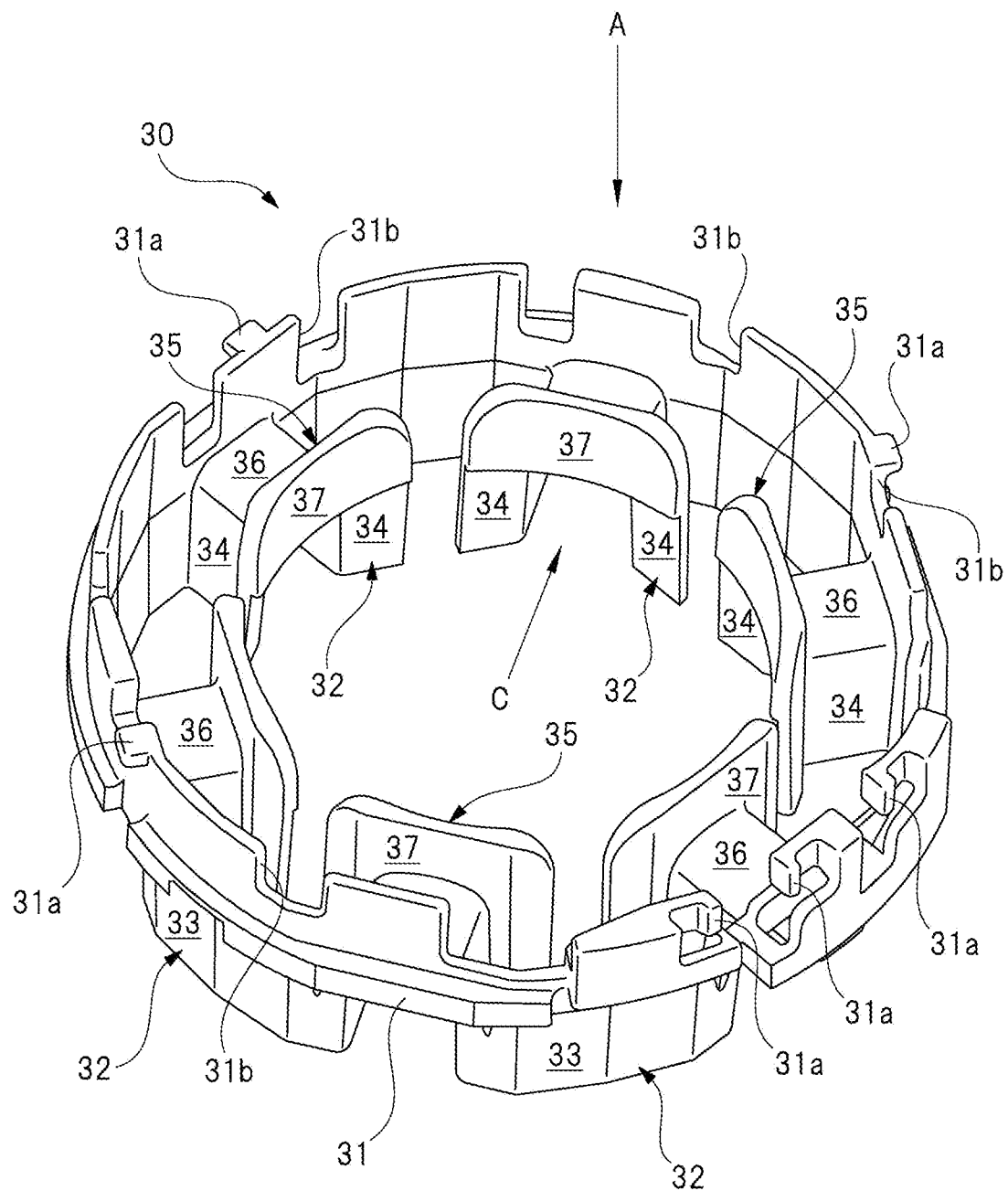
FIG. 3 is a perspective view showing one insulator as a single unit.
Figure 4:
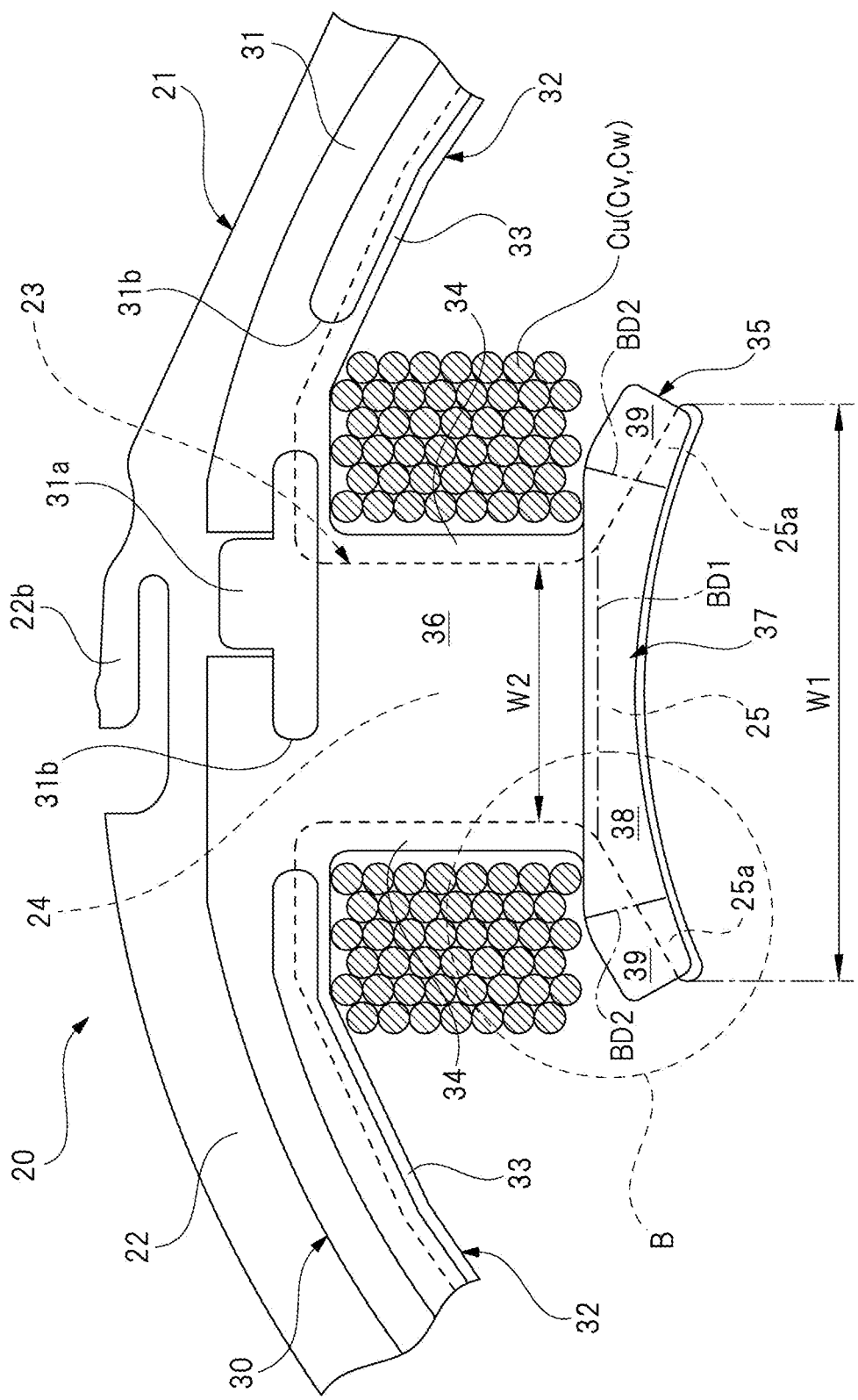
FIG. 4 is a view viewed from an arrow A of FIG. 3 (with illustration of a core and a coil).
Figure 5:
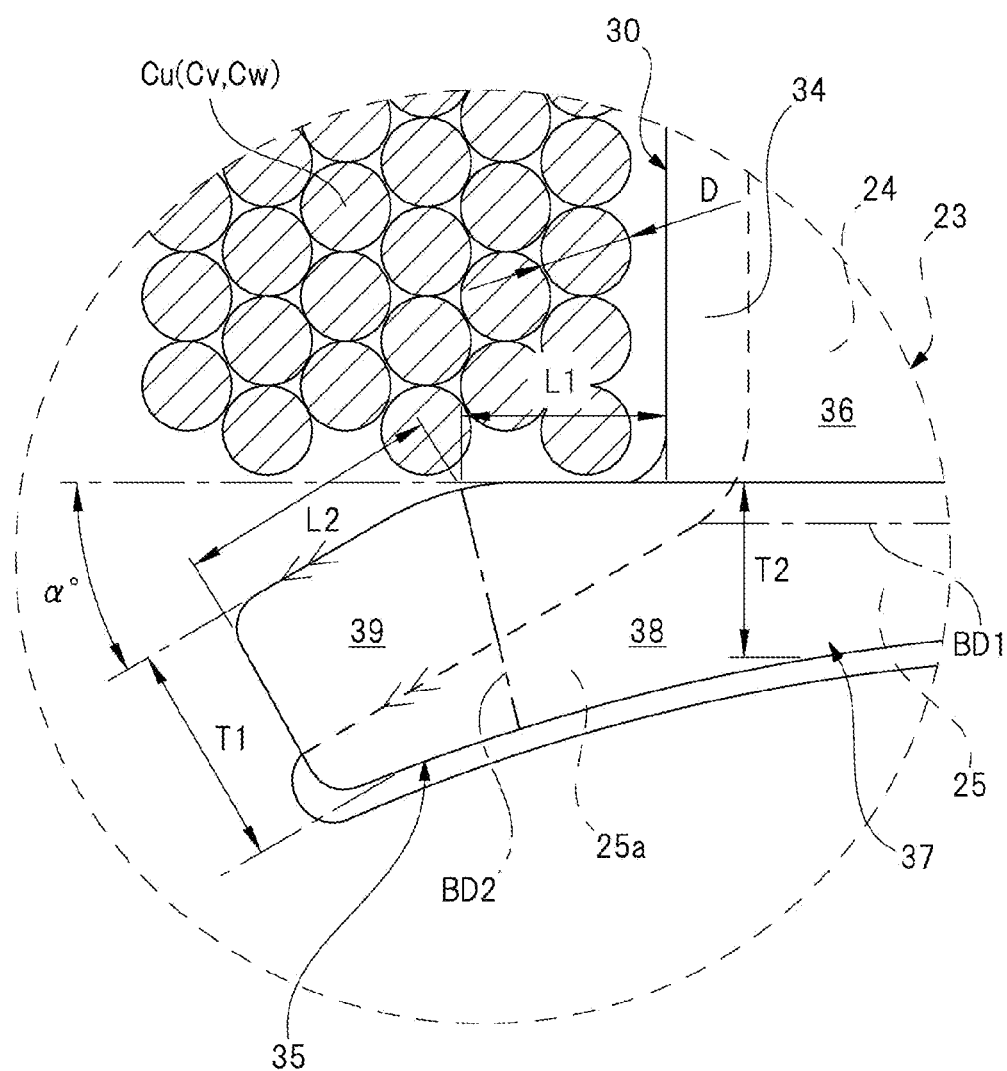
FIG. 5 is an enlarged view of a broken line circle B part of FIG. 4.
Figure 6:
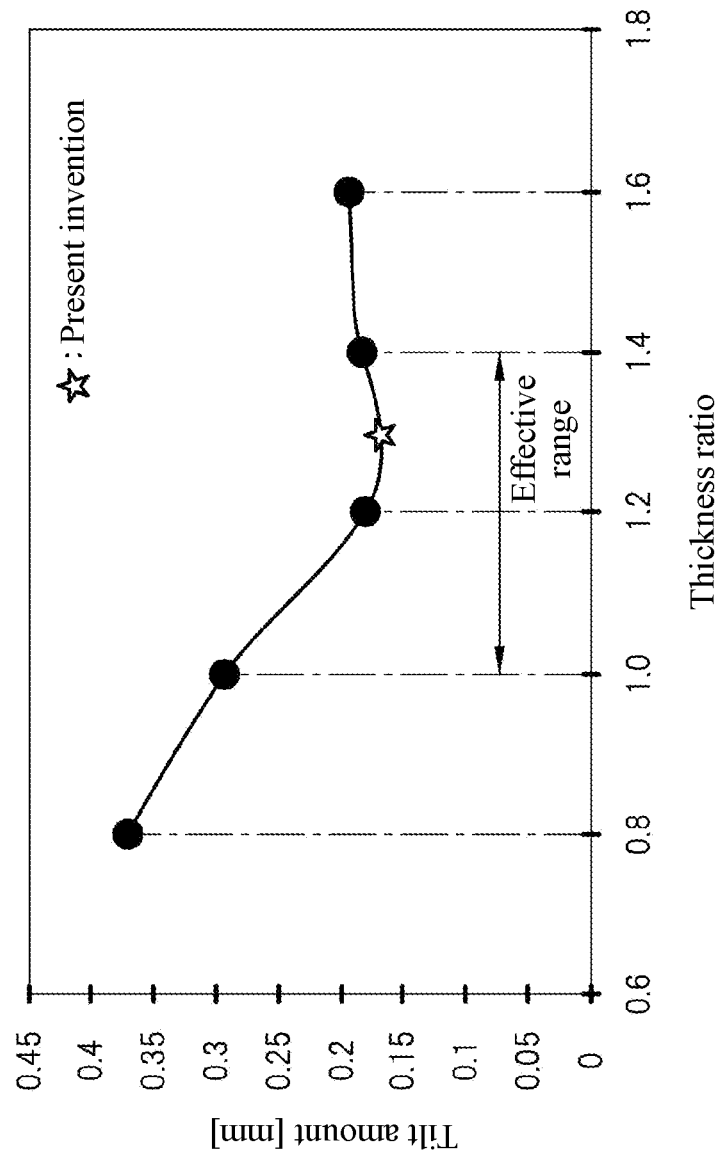
FIG. 6 is a graph illustrating a relationship between a thickness ratio and an inner wall tilt amount.
Figure 7:
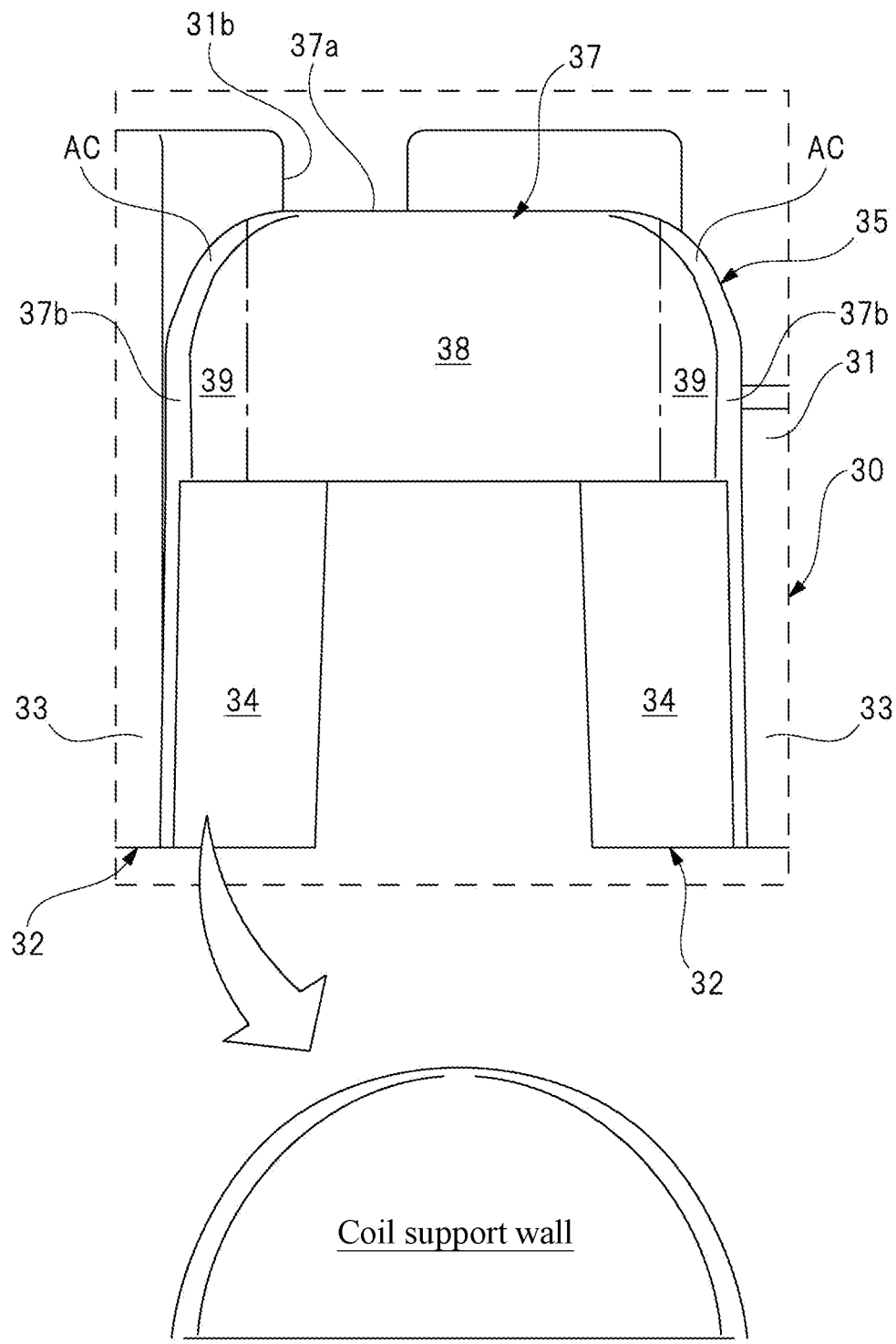
FIG. 7 is a view viewed from an arrow C of FIG. 3.
Figure 8:
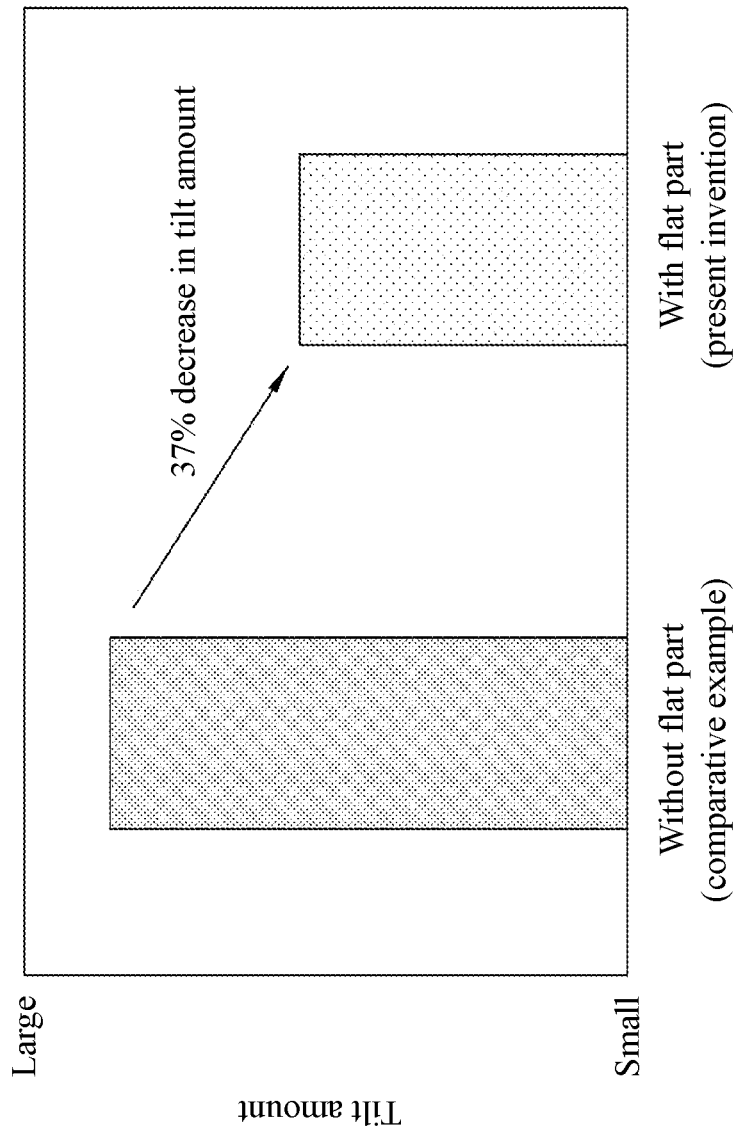
FIG. 8 shows a comparative graph of inner wall tilt amounts according to a difference in the shape of a coil support wall.

FIG. 1 is a perspective view showing a motor with a speed reduction mechanism (motor cover omitted); FIG. 2 is a perspective view showing a stator core and a bus bar unit; FIG. 3 is a perspective view showing one insulator as a single unit; FIG. 4 is a view viewed from an arrow A of FIG. 3 (with illustration of a core and a coil); FIG. 5 is an enlarged view of a broken line circle B part of FIG. 4; FIG. 6 is a graph illustrating a relationship between a thickness ratio and an inner wall tilt amount; FIG. 7 is a view viewed from an arrow C of FIG. 3; FIG. 8 shows a comparative graph of inner wall tilt amounts according to a difference in the shape of a coil support wall.

A motor 10 with a speed reduction mechanism shown in FIG. 1 is an in-vehicle motor device which is small in size but is capable of producing a large output; the motor 10 with a speed reduction mechanism is used as a drive source for a wiper device mounted on the front side of a vehicle (not shown). Specifically, the motor 10 with a speed reduction mechanism swings and drives wiper arms (not shown) on the driver's seat side and the passenger seat side via a link mechanism (not shown).

The motor 10 with a speed reduction mechanism includes a housing 11 which accommodates therein a worm speed reducer (not shown). The housing 11 is formed into a predetermined shape by injection molding a molten aluminum material or the like, and includes a speed reduction mechanism accommodating part 12 and a motor fixing part 13. A worm and a worm wheel (worm speed reducer) are accommodated inside the speed reduction mechanism accommodating part 12.

The worm constituting the worm speed reducer is rotated at high speed by a rotating shaft 26b constituting a brushless motor 20. In contrast, the worm wheel meshed with the worm is rotated in a state of being decelerated and having a high torque. An output shaft 14 is fixed to the rotation center of the worm wheel, and the rotational force (high output) of the output shaft 14 is transmitted to a link mechanism constituting the wiper device.

An opening portion (upper part in the figure) of the speed reduction mechanism accommodating part 12 is sealed by a gear cover 15 formed in a substantially flat plate shape by a resin material such as plastic. The gear cover 15 is fixed to the housing 11 by a total of three fixing screws S1.

A control board (not shown) which detects the rotational state of the output shaft 14 and controls the rotational state of the rotating shaft 26b is fixed inside the gear cover 15. The gear cover 15 is integrally provided with a connector connecting part 16 to which an external connector (not shown) on the vehicle side is connected. Accordingly, a drive current is supplied to the control board and a terminal holder 27 (see FIG. 2) constituting the brushless motor 20, and thus the motor 10 with a speed reduction mechanism operates.

A brushless motor 20 is fixed to the motor fixing part 13 constituting the housing 11. The motor fixing part 13 is opened in a direction orthogonal to the axial direction of the output shaft 14, and the axis of the output shaft 14 and the axis of the brushless motor 20 (the rotating shaft 26b) are orthogonal to each other. Specifically, the motor fixing part 13 is formed in a substantially cylindrical shape, and a stator core 21 formed in a substantially cylindrical shape is fitted on the radially inner side of the motor fixing part 13. Further, the stator core 21 is firmly fixed to the housing 11 by a pair of fixing screws S2.

Herein, a motor cover made of resin which covers the brushless motor 20 is fixed to the motor fixing part 13, but in FIG. 1, the illustration of the motor cover is omitted in order to make it easier to understand the brushless motor 20 fixed to the motor fixing part 13.

As shown in FIG. 1 and FIG. 2, the brushless motor 20 includes a stator core (stator) 21 fixed to the motor fixing part 13. The stator core 21 is formed by laminating a plurality of annular steel plates (magnetic body), and includes a core main body part 22 formed in a substantially cylindrical shape. Further, a total of six teeth 23 are integrally provided on the radially inner side of the core main body part 22. These teeth 23 protrude radially to the radially inner side of the core main body part 22, and are arranged at equal intervals (60° intervals) in the circumferential direction of the core main body part 22.

As shown in FIG. 4, the tooth 23 is formed in a substantially T-shape when the stator core 21 is viewed from the axial direction, and includes a tooth main body part 24 and a tooth tip part 25. Herein, the boundary between the tooth main body part 24 and the tooth tip part 25 is indicated by a boundary line BD1 (dot-dash line).

The tooth main body part 24 is formed toward the central portion (lower part in the figure) of the core main body part 22, and the base end side (upper side in the figure) of the tooth main body part 24 is connected to the radially inner side of the core main body part 22. Further, the tooth tip part 25 is integrally provided on the tip side (lower side in the figure) of the tooth main body part 24, and a width dimension W1 of the tooth tip part 25 with respect to the circumferential direction of the core main body part 22 is about twice as wide as a width dimension W2 of the tooth main body part 24 with respect to the circumferential direction of the core main body part 22 (W1≈2×W2).

Two sides of the tooth tip part 25 in the circumferential direction of the core main body part 22 protrude from the tooth main body part 24 at the same protrusion height, and the portion of the tooth tip part 25 protruding from the tooth main body part 24 respectively forms a tooth protruding part 25a. Accordingly, a coil Cu (Cv, Cw) wound around the tooth main body part 24 is prevented from falling off from the tooth main body part 24, and the electromagnetic force generated by supplying the drive current to the coil Cu (Cv, Cw) is efficiently transmitted to a rotor 26.

Herein, as shown in FIG. 1, the rotor 26 is rotatably provided on the radially inner side of the stator core 21 via a minute gap (air gap). Further, the rotor 26 includes a rotor main body 26a formed by laminating a plurality of steel plates (magnetic body), a cylindrical magnet MG fixed to the surface of the rotor main body 26a, and a rotating shaft 26b fixed to the rotation center of the rotor main body 26a.

In this manner, this embodiment adopts a brushless motor 20 having a surface permanent magnet (SPM) structure in which the cylindrical magnet MG is fixed to the surface of the rotor main body 26a. However, the disclosure is not limited to the brushless motor 20 having the SPM structure as described above, but it is also possible to adopt a brushless motor having an interior permanent magnet (IPM) structure in which a plurality of magnets (not shown) are embedded inside the rotor body.

As shown in FIG. 2, a pair of screw insertion holes 22a are provided on the radially outer side of the core main body part 22. A pair of fixing screws S2 (see FIG. 1) for fixing the stator core 21 to the housing 11 are respectively inserted into the screw insertion holes 22a. Further, a plurality of elastic claw parts 22b are provided on the radially outer side of the core main body part 22. The elastic claw parts 22b are elastically contacted with the inner wall of the motor fixing part 13, which prevents the core main body part 22 (the stator core 21) from rattling with respect to the motor fixing part 13.

Coils Cu, Cv, and Cw corresponding to U-phase, V-phase, and W-phase are respectively wound around a total of six teeth 23 by concentrated winding via an insulator (insulating material) 30. Then, as shown in FIG. 2, the ends of the three-phase coils Cu, Cv, and Cw are each drawn out from the axial end of the stator core 21 to the outside. Herein, in FIG. 1 and FIG. 2, the coils Cu, Cv, and Cw are shaded in order to make it easier to understand the arrangement relationship of the coils Cu, Cv, and Cw.

The coils Cu, Cv, and Cw drawn out to the outside of the stator core 21 are respectively electrically connected to one ends of three female terminals Tu, Tv, and Tw provided on the terminal holder 27. Then, three male power supply terminals (not shown) provided on the control board are electrically connected to the other ends of the respective female terminals Tu, Tv, and Tw. That is, in a state in which the motor 10 with a speed reduction mechanism is assembled, the terminal holder 27 is accommodated inside the housing 11.

Herein, the terminal holder 27 is formed in a substantially annular shape by injection molding a resin material such as plastic, and includes an annular main body part 27a and a holding protrusion 27b protruding in the axial direction of the annular main body part 27a. The three female terminals Tu, Tv, and Tw are each held by the holding protrusion 27b in a state of being insulated from each other. Further, the annular main body part 27a is provided with a plurality of engaging claws 27c (only two are shown in the figure), and these engaging claws 27c respectively engage with a plurality of engaging recesses 31c provided in the insulator 30. Accordingly, the terminal holder 27 is fixed to the stator core 21 without rattling.

As shown in FIG. 1 and FIG. 2, insulators 30 formed in the same shape are mounted on two axial sides of the core main body part 22. Specifically, this pair of insulators 30 are arranged to be mirror-image symmetric to each other to sandwich the core main body part 22 from the axial direction.

As shown in FIG. 3, the insulator 30 is formed in a substantially annular shape by injection molding a resin material (insulating body) such as plastic, and includes an insulator main body 31 in an annular shape. The insulator main body 31 is a portion which is overlapped with the axial end of the core main body part 22 (see FIG. 2) from the axial direction of the core main body part 22. Further, the insulator main body 31 has a function of distributing the three-phase coils Cu, Cv, and Cw (see FIG. 2) respectively to the predetermined teeth 23.

Specifically, the insulator main body 31 is provided with a plurality of hooking claws 31a on which the respective coils Cu, Cv, and Cw are hooked, and a plurality of notches 31b crossed by the respective coils Cu, Cv, and Cw. Accordingly, as shown in FIG. 2, the three-phase coils Cu, Cv, and Cw are arranged at the portion of the insulator main body 31, i.e., at the end of the core main body part 22. Also, as shown in FIG. 2, a plurality of engaging recesses 31c (only two are shown in the figure) with which the engaging claws 27c of the terminal holder 27 are engaged are provided at the outer peripheral portion of the insulator main body 31.

Further, as shown in FIG. 3, on the axially lower side (lower side in the figure) of the insulator main body 31, a plurality of insertion wall parts 32 formed in a substantially U-shape are integrally provided on the radially inner side of the insulator main body 31. The insertion wall parts 32 are inserted into slots SL (see FIG. 2) between adjacent teeth 23 from the axial direction of the core main body part 22. The insertion wall part 32 includes a first covering part 33 covering the radially inner side of the core main body part 22, and a pair of second covering parts 34 respectively covering opposing portions of adjacent teeth 23.

Further, a plurality of tooth covering parts 35 to be overlapped to cover the teeth 23 from the axial direction of the core main body part 22 are provided on the radially inner side of the insulator main body 31. A total of six tooth covering parts 35 are provided corresponding to the teeth 23, and as shown in FIG. 4, the tooth covering part 35 includes a third covering part 36 to be overlapped with the tooth main body part 24 and a coil support wall 37 to be overlapped with the tooth tip part 25.

Herein, the second covering part 34 and the third covering part 36 are arranged to surround the periphery of the tooth main body part 24, and are each set to have substantially the same thickness dimension (thickness). In contrast, the coil support wall 37 is provided to stand upright in the axial direction of the core main body part 22, and the height dimension of the coil support wall 37 in the axial direction of the core main body part 22 is larger than the thickness dimension of the coil support wall 37 in the radial direction of the core main body part 22.

When the coil Cu (Cv, Cw) is wound around the tooth 23, the coil support wall 37 has a function of protecting the enamel coating film provided on the surface of the coil Cu (Cv, Cw) from peeling off (coil protection function). In addition, the coil support wall 37 has a function of supporting the respective coil Cu (Cv, Cw) wound around the tooth 23 from the radially inner side of the core main body part 22 (coil support function).

Herein, to increase the space factor of the coil Cu (Cv, Cw), it is necessary to wind the coil Cu (Cv, Cw) tightly around the tooth 23, and it is desirable to increase the rigidity of the coil support wall 37. Further, to surely prevent the coil Cu (Cv, Cw) wound around the teeth 23 from collapsing (tilting) to the radially inner side of the core main body part 22, it is also desirable to increase the rigidity of the coil support wall 37.

However, if the thickness dimension of the coil support wall 37 is simply increased to increase the rigidity, it becomes difficult to reduce the size and weight of the motor 10 with a speed reduction mechanism, and it becomes particularly difficult to use it for in-vehicle use. Therefore, in this embodiment, the shape of the coil support wall 37 is devised to increase its rigidity without embedding a reinforcing member or the like inside the coil support wall 37 and without increasing the physique of the coil support wall 37 as much as possible.

Hereinafter, the shape of the coil support wall 37 will be described in detail with reference to FIG. 4, FIG. 5, and FIG. 7. As shown in FIG. 4, FIG. 5, and FIG. 7, the coil support wall 37 is provided to stand upright in the axial direction of the core main body part 22 and is provided along the circumferential direction of the core main body part 22. The coil support wall 37 includes one first wall part 38 and two second wall parts 39 arranged alternately in the circumferential direction of the core main body part 22.

The one first wall part 38 is arranged at a portion corresponding to the tooth main body part 24 in the circumferential direction of the core main body part 22. On the other hand, the two second wall parts 39 are respectively arranged at portions corresponding to the tooth tip part 25 protruding from the tooth main body part 24 in the circumferential direction of the core main body part 22, i.e., at portions corresponding to the pair of tooth protruding parts 25a. In this manner, the one first wall part 38 is arranged between the two second wall parts 39.

Further, the first wall part 38 is formed along a direction orthogonal to the protruding direction (up-down direction in FIG. 4) of the tooth main body part 24, and covers a portion of the boundary line BD1 from the axial direction of the core main body part 22. On the other hand, the second wall part 39 is parallel to the tooth protruding part 25*a* and is provided to be inclined with respect to the first wall part 38 to the radially inner side of the core main body part 22. In particular, as shown by the symbol (<<) indicating parallelism in FIG. 5, the surfaces of the second wall part 39 and the tooth protruding part 25*a* on the coil Cu (Cv, Cw) side are parallel to each other.

As shown in FIG. 5, the first wall part 38 and the second wall part 39 are gently inclined to each other along the arc shape of the outer peripheral portion of the rotor 26 (see FIG. 1), and on the side opposite to the rotor 26 side, an angle of the extending direction of the second wall part 39 with respect to the extending direction of the first wall part 38 is set to $\alpha°$ (about 30°).

The first wall part 38 and the second wall part 39 are connected to each other at an angle at a portion of the tooth tip part 25 protruding from the tooth main body part 24 in the circumferential direction of the core main body part 22, i.e., at a portion of the pair of tooth protruding parts 25*a*. Specifically, as shown in FIG. 4 and FIG. 5, a boundary line BD2 between the first wall part 38 and the second wall part 39 is arranged at a portion of the tooth protruding part 25*a* in the circumferential direction of the core main body part 22.

Accordingly, as shown in FIG. 5, the first wall part 38 has a length dimension L1 longer than a diameter dimension D of the coil Cu (Cv, Cw) and extends to a portion of the tooth protruding part 25*a* (L1>D). Specifically, the first wall part 38 is extended to a second winding portion of the coil Cu (Cv, Cw) at the portion of the tooth protruding part 25*a*. Accordingly, the coil support wall 37 can surely support a winding start portion of the coil Cu (Cv, Cw). This means that the coil Cu (Cv, Cw) can be wound more tightly around the tooth 23 (the insulator 30). Therefore, it is possible to increase the space factor of the coil Cu (Cv, Cw) and realize a motor 10 with a speed reduction mechanism that is compact and lightweight but has a higher output.

Further, a thickness dimension T1 (average value) of the second wall part 39 in the radial direction of the core main body part 22 is equal to or larger than a thickness dimension T2 (average value) of the first wall part 38 in the radial direction of the core main body part 22 (T1>T2). Accordingly, even if the coil Cu (Cv, Cw) collapses to the radially inner side of the core main body part 22 and the first wall part 38 is about to tilt, the strain is not easily transmitted to the second wall part 39. That is, the overall rigidity of the coil support wall 37 is increased as compared to a coil support wall (not shown) having a uniform thickness dimension. Further, since the portion of the boundary line BD2 between the first wall part 38 and the second wall part 39 forms a corner part having an angle $\alpha°$, the corner part functions as a reinforcing rib. In this respect as well, the rigidity of the coil support wall 37 is increased.

Further, at the portion of the tooth protruding part 25*a*, a length dimension L2 of the second wall part 39 is larger than the length dimension L1 of the first wall part 38 (L2>L1). Specifically, the length dimension L2 of the second wall part 39 is about 1.3 times the length dimension L1 of the first wall part 38 (L2≈1.3×L1). Accordingly, the second wall part 39 functions as a guide wall part when the coil Cu (Cv, Cw) is wound to the tooth 23 (the insulator 30). Therefore, easy and smooth winding work is possible.

Then, in the magnitude relationship between the length dimension L1 of the first wall part 38 and the length dimension L2 of the second wall part 39 as shown in FIG. 5, it is desirable to set the average thickness dimension T1 of the second wall part 39 to be 1.0 to 1.4 times the average thickness dimension T2 of the first wall part 38. In this embodiment, the thickness dimension T1 is about 1.3 times the thickness dimension T2 (T1≈1.3×T2). Accordingly, the characteristics shown in FIG. 6 can be obtained.

That is, when the average thickness dimension T1 of the second wall part 39 is set to "1.0 times" the average thickness dimension T2 of the first wall part 38, after winding the coil Cu (Cv, Cw), the coil support wall 37 tilts to the radially inner side of the core main body part 22 by about 0.3 mm. This "tilt amount of 0.3 mm" refers to the maximum tilt amount with which the coil support wall 37 does not touch the rotor 26 (see FIG. 1) in a compact, lightweight, high-output motor 10 with a speed reduction mechanism suitable for in-vehicle use, i.e., with which the motor 10 with a speed reduction mechanism can be realized as a product. The rigidity of the coil support wall 37 in the case of setting to "1.0 times" is ensured by the corner part having an angle $\alpha°$ at the portion of the boundary line BD2 between the first wall part 38 and the second wall part 39.

On the other hand, if the average thickness dimension T1 of the second wall part 39 is larger than "1.4 times" the average thickness dimension T2 of the first wall part 38, and the difference between the thickness dimension T1 and the thickness dimension T2 becomes large, for example, the amount of sink marks during injection molding of the insulator 30 may increase. That is, a manufacturing error of the insulator 30 may occur for each product. Therefore, distortion is present in the coil support wall 37 before winding the coil Cu (Cv, Cw), and thus the tilt amount of the coil support wall 37 after winding the coil Cu (Cv, Cw) may become uncontrollable.

From the above, in this embodiment, the effective range of the thickness ratio of the average thickness dimension T1 of the second wall part 39 to the average thickness dimen- sion T2 of the first wall part 38 is set from 1.0 times to 1.4 times. Accordingly, it is possible to realize a motor 10 with a speed reduction mechanism that is compact, lightweight, has a high output, and can suppress the tilt amount of the coil support wall 37 to 0.3 mm or less after winding the coil Cu (Cv, Cw) and can significantly reduce occurrence of defective products.

Furthermore, as shown in FIG. 7, it is desirable that the coil support wall 37 (the first wall part 38 and the second wall part 39) has a substantially rectangular shape when the insulator 30 is viewed from its radially inner side. Specifically, the shape of the coil support wall 37 is determined to include a first flat part 37*a* formed along the circumferential direction (left-right direction in the figure) of the core main body part 22 and a second flat part 37*b* formed along the axial direction (up-down direction in the figure) of the core main body part 22. In addition, an arc part AC having a predetermined curvature is provided at the connection portion between the first flat part 37*a* and the second flat part 37*b*, so that the coil Cu (Cv, Cw) does not get caught by the coil support wall 37 when the coil Cu (Cv, Cw) is wound.

In this manner, by making the shape of the coil support wall 37 a substantially rectangular shape, and as described above, making the thickness dimension T1 about 1.3 times the thickness dimension T2, as shown in FIG. 8, the tilt amount of the coil support wall 37 can be further reduced. Specifically, a light-color shaded graph (on the right side in the figure) shows the coil support wall 37 (present invention)

in a substantially rectangular shape having a flat part, and a dark-color shaded graph (on the left side in the figure) shows an arc-shaped coil support wall without a flat part (comparative example, see FIG. 7). According to the graph of FIG. 8, it is found that the tilt amount can be reduced by about 37% (with respect to the comparative example).

As described in detail above, according to this embodiment, the first wall part 38 and the second wall part 39 constituting the coil support wall 37 are connected to each other at an angle at a portion (the tooth protruding part 25a) of the tooth tip part 25 protruding from the tooth main body part 24 in the circumferential direction of the core main body part 22, and the thickness dimension T1 of the second wall part 39 in the radial direction of the core main body part 22 is equal to or larger than the thickness dimension T2 of the first wall part 38 (T1>T2).

Accordingly, the rigidity of the coil support wall 37 can be increased without embedding a reinforcing member in the coil support wall 37. Therefore, it is possible to effectively suppress collapse of the coil Cu (Cv, Cw) to the radially inner side without complicating the structure or complicating the manufacturing process.

Further, according to this embodiment, the first wall part 38 is formed along a direction orthogonal to a protruding direction of the tooth main body part 24, and the second wall part 39 is inclined with respect to the first wall part 38 to the radially inner side of the core main body part 22.

Accordingly, the coil support wall 37 can be configured along the shape of the tooth tip part 25 while increasing the rigidity of the coil support wall 37, and thus a minute gap (air gap) between the rotor 26 and the stator core 21 can be maintained at an appropriate value.

Further, according to this embodiment, the second wall part 39 is parallel to a portion of the tooth tip part 25 protruding from the tooth main body part 24.

Accordingly, substantially the entire area of the second wall part 39 can have substantially the same rigidity. Therefore, the rigidity of the coil support wall 37 can be easily controlled (simulated), and the design of the insulator 30 can be facilitated.

Further, the thickness dimension T1 of the second wall part 39 is 1.0 to 1.4 times the thickness dimension T2 of the first wall part 38.

Accordingly, while minimizing the tilt amount of the coil support wall 37 and making it compatible with the compact, lightweight, high-output motor 10 with a speed reduction mechanism suitable for in-vehicle use, it is possible to suppress occurrence of sink marks which occur during production of the insulator 30 and prevent the accuracy of the insulator 30 from varying from product to product.

Further, according to this embodiment, the coil support wall 37 includes a first flat part 37a formed along the circumferential direction of the core main body part 22, and a second flat part 37b formed along the axial direction of the core main body part 22.

Accordingly, it is possible to further reduce the tilt amount of the coil support wall 37.

Obviously, the present invention is not limited to the above embodiment and may be variously modified without departing from the gist thereof. For example, in the above embodiment, although it has been shown that the brushless motor 20 is applied to the motor 10 with a speed reduction mechanism used as the drive source of a wiper device, the present invention is not limited thereto. For example, it may be applied to a drive source of a motor with a speed reduction mechanism used in other in-vehicle devices such as a power slide door device and a power window device.

In addition, the material, shape, dimensions, number, installation location, etc. of each component in the above embodiment are arbitrary and are not limited to the above embodiment as long as the present invention can be achieved.

REFERENCE SIGNS LIST

What is claimed is:

1. A brushless motor comprising:
a stator core; and
a rotor which rotates with respect to the stator core,
the brushless motor having:
a core main body part provided in the stator core and formed in a cylindrical shape;
a plurality of teeth provided on the core main body part and protruding radially to a radially inner side of the core main body part;
a tooth main body part provided in the tooth and having a base end side connected to the core main body part;
a tooth tip part which is provided at a tip side of the tooth main body part and is wider than the tooth main body part in a circumferential direction of the core main body part;
a covering part surrounding the tooth main body part; and
a coil support wall made of resin which is overlapped with the tooth tip part from an axial direction of the core main body part and supports a coil wound around the core main body part from the radially inner side of the core main body part,
wherein the coil support wall comprises a first wall part and a second wall part arranged in the circumferential direction of the core main body part,
a portion of the tooth tip part protruding from the tooth main body part forms a tooth protruding part,
the first wall part and the second wall part are connected to each other at an angle at a portion of the tooth protruding part protruding from the tooth main body part in the circumferential direction of the core main body part, and a thickness dimension of the second wall part in a radial direction of the core main body part is equal to or larger than a thickness dimension of the first wall part,
a boundary line between the first wall part and the second wall part is arranged at a portion of the tooth protruding part in the radial direction of the core main body part, and
a distance between the boundary line and the covering part in the circumferential direction is greater than a diameter dimension of the coil.

2. The brushless motor according to claim 1, wherein the first wall part is formed along a direction orthogonal to a protruding direction of the tooth main body part, and the second wall part is inclined with respect to the first wall part to the radially inner side of the core main body part.

3. The brushless motor according to claim 1, wherein the second wall part is parallel to a portion of the tooth tip part protruding from the tooth main body part.

4. The brushless motor according to claim 1, wherein the thickness dimension of the second wall part is 1.0 to 1.4 times the thickness dimension of the first wall part.

5. The brushless motor according to claim 1, wherein the coil support wall comprises:
a first flat part formed along the circumferential direction of the core main body part; and a second flat part formed along the axial direction of the core main body part.

\* \* \* \* \*